J. ORLAY.
DEVICE FOR CONTROLLING THE COURSE OF SHIPS IN FOGGY WEATHER.
APPLICATION FILED APR. 27, 1908.

926,822.

Patented July 6, 1909.
2 SHEETS—SHEET 1.

Witnesses:

Inventor:
Jerome Orlay

J. ORLAY.
DEVICE FOR CONTROLLING THE COURSE OF SHIPS IN FOGGY WEATHER.
APPLICATION FILED APR. 27, 1908.

926,822.

Patented July 6, 1909.
2 SHEETS—SHEET 2.

UNITED STATES PATENT OFFICE.

JEROME ORLAY, OF TEMSCHE, BELGIUM.

DEVICE FOR CONTROLLING THE COURSE OF SHIPS IN FOGGY WEATHER.

No. 926,822.   Specification of Letters Patent.   Patented July 6, 1909.

Application filed April 27, 1908. Serial No. 429,446.

*To all whom it may concern:*

Be it known that I, JEROME ORLAY, a subject of the King of Belgium, and resident of Temsche, Belgium, have invented certain new and useful Improvements in Devices for Controlling the Course of Ships in Foggy Weather, set forth in the annexed specification.

This invention relates to a device for controlling the course of ships, which in connection with a compass is designed to indicate in foggy weather the right course, corresponding to the time being, the ship has to take, in order to prevent collision with other ships.

Figure 1:
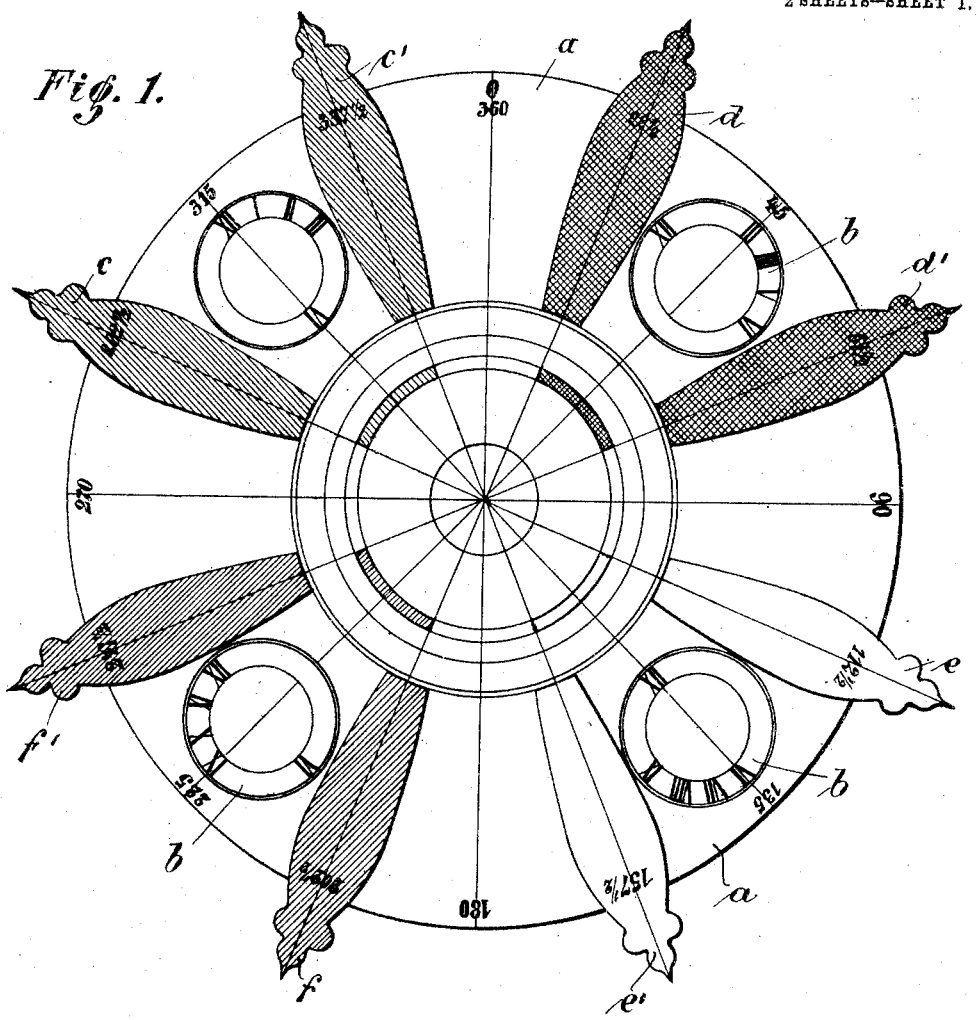
Figure 2:
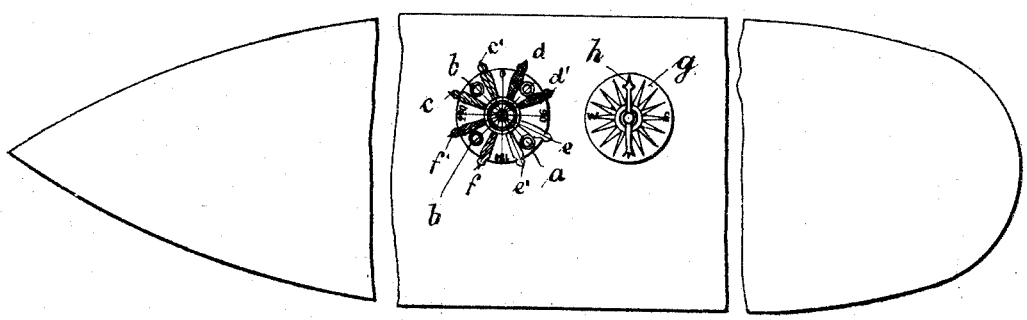
Figure 3:
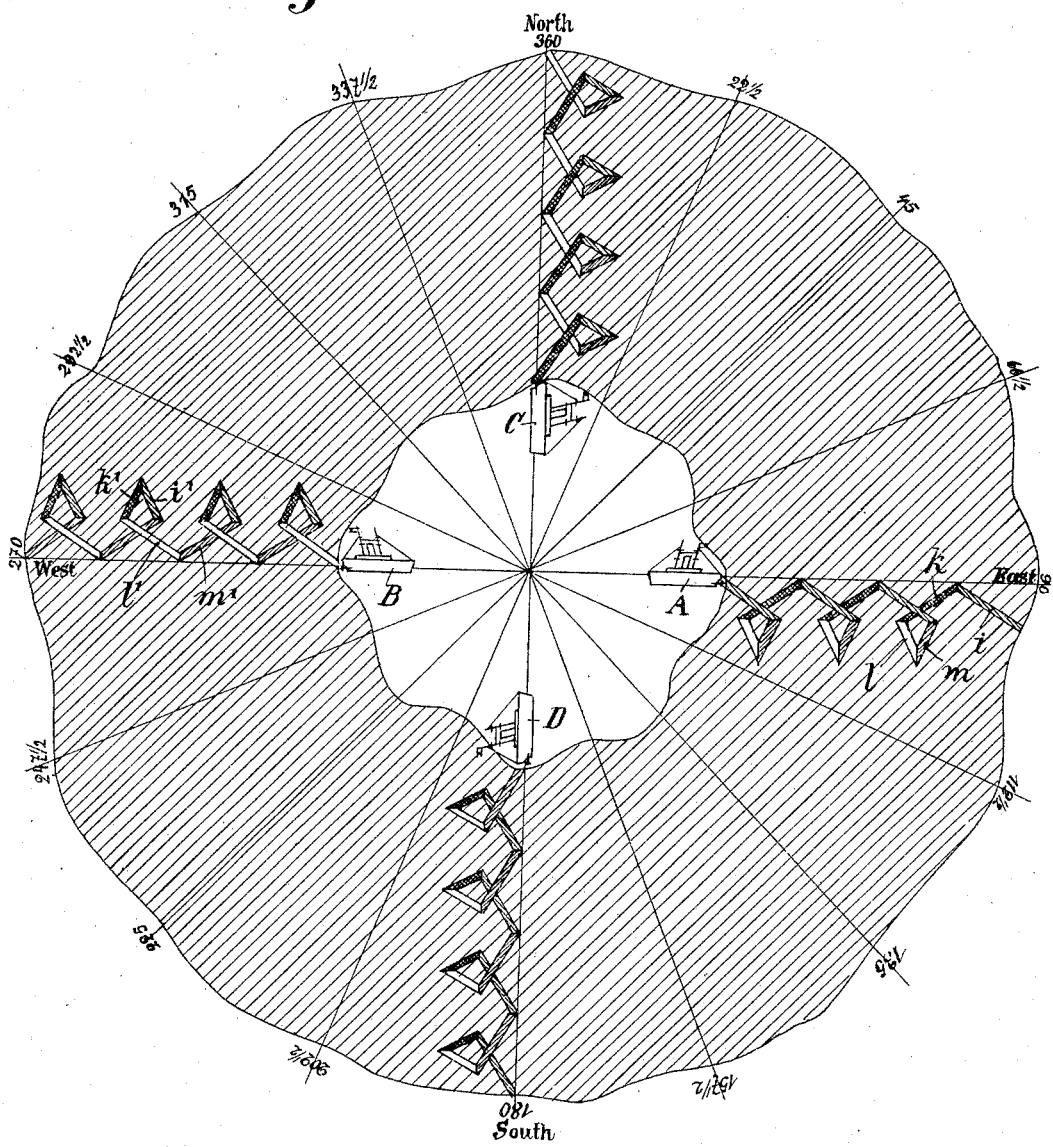

In the accompanying drawing, Figure 1 is a plan of the device; Fig. 2 represents in a diagrammatical view the arrangement of the device with a compass on the ship, both being for sake of clearness shown on a larger scale than the ship. Fig. 3 shows a diagram of the courses indicated by the device to the ships in foggy weather.

The device comprises a round disk $a$ of glass, copper or other metal, which possesses four dial plates $b$ arranged thereon in a concentric circle at the angles of 45°, 135°, 225° and 315°. The dial plate disposed at the angle of 315° is provided with the figures I–III, that at 45° with the figures III–VI, and so on, as shown. At both sides of each dial plate pointers $c\ c^1$, $d\ d^1$, $e\ e^1$, and $f\ f^1$ respectively, are arranged which are disposed radially on the disk $a$ so as to point outward. Each two pointers belonging to the same dial plate may be provided with the same coloring or marking, while all the four pairs of pointers are differently colored or marked.

The disk $a$ is mounted immovably on all the ships, and preferably near the helm and in proximity to a stationary compass $g$. The arrangement shown is such that, when the ship points with its stem to the west and its longitudinal axis lies at right angles to the needle $h$ of the compass, the axis passing through the center of the disk $a$ at 90° and 270° runs parallel to the longitudinal axis of the ship. The disk $a$ may be arranged detachable so that in clear weather it can be removed and in foggy weather again put in place.

As soon as a ship encounters foggy weather, it is, corresponding to the actual time being, turned in such a manner that that pointer which lies beside the dial plate indicating the respective quarter of an hour runs parallel to the needle of the compass. This course of the ship is maintained until the respective quarter of an hour is over whereupon the ship must again be turned.

Supposing a ship travels from east to west (see A, Fig. 3), it is at the beginning of the first quarter of an hour so turned that the pointer $c^1$ is directed parallel to the compass needle, whereby the ship receives the course direction $i$. At the commencement of each following quarter of an hour, a further turning of the ship must be executed in such a way that during the second quarter of an hour the pointer $d$, during the third quarter of an hour the pointer $e$, and during the fourth quarter of an hour the pointer $f^1$ runs parallel to the compass needle so that the ship travels in succession in the directions $i$, $k$, $l$ and $m$. The speed of the ship, upon its traveling in the directions $i$ and $k$, is however greater than on its way in the directions $l$ and $m$ so that it advances in spite of its zigzag course described. The ship may, for instance, travel during the first and second quarters of an hour with a speed of 12, and during the third and fourth quarters of an hour with a speed of 8, knots.

A ship traveling from west to east (see B, Fig. 3), is in succession turned in such a way that during the first quarter of an hour the pointer $c$, during the second the pointer $d^1$, during the third the pointer $e^1$, and during the fourth the pointer $f$ points to north as does also the compass needle, whereby the ship travels first in the direction $i^1$, then $k^1$, $l^1$ and $m^1$. The speed of the ship is here in the first and second quarters of an hour 8, and in the third and fourth quarters of an hour, 12 knots.

The course and speed at which ships travel (C and D) from north to south and from south to north during the single quarters of an hour, is, after the above description and as seen on Fig. 3, quite obvious without further description.

All ships follow thus at any time the same course, and only the angle and speed at which a ship travels a certain main course deviate slightly from the angles and speeds of ships with other main courses.

A collision of ships with different main courses can be easily prevented by each ship giving, corresponding to its main course, certain signals. For instance, a ship traveling westward gives a single, one traveling eastward a double signal, and so on. A ship can, upon the signal of another ship with another main course, at the necessary moment easily be turned and its speed correspondingly reduced or increased.

Sailing vessels have as concerns speed and course to conform as far as possible with the improved device. The signals indicating their main course must, according to the course, be given by 1, 2, 3 or 4 gun shots. A steamer, upon said signals, has to search for the sailing vessel and to tow it along.

The improved controlling device as well as the system by which the traffic on the sea is controlled in foggy weather, may be of course further developed and perfected. The improved controlling device may in the same way be used also for air ships.

Having fully described my invention, what I claim and desire to secure by Letters Patent is:—

A device for controlling the course of ships in foggy weather with the aid of a stationary compass, comprising in combination an immovably mounted disk arranged on ship's deck in proximity to said compass, four dial plates arranged on said disk in a concentric circle and at angles of 90° to each other and designed to indicate the first, second, third and fourth quarter of an hour respectively, and a pair of pointers arranged beside each dial plate and provided each with a different coloring and designed to indicate by their position relative to the needle of said compass the different courses of the ship at each quarter of an hour, substantially as described and shown.

In testimony whereof I have hereunto set my hand in the presence of two subscribing witnesses.

JEROME ORLAY.

Witnesses:
GREGORY PHELAN,
JAMES DE G. FAY.